(12) United States Patent
Guo (10) Patent No.: US 10,198,672 B2
(45) Date of Patent: Feb. 5, 2019

(54) SINGLE TREE SEGMENTATION METHOD AND APPARATUS

(71) Applicant: BEIJING GREENVALLEY TECHNOLOGY CO., LTD., Beijing (CN)

(72) Inventor: Yanming Guo, Beijing (CN)

(73) Assignee: Beijing Greenvalley Technology Co., Ltd., Beijing (CN)

( * ) Notice: Subject to any disclaimer, the term of this patent is extended or adjusted under 35 U.S.C. 154(b) by 116 days.

(21) Appl. No.: 15/368,459

(22) Filed: Dec. 2, 2016

(65) Prior Publication Data
US 2018/0082424 A1 Mar. 22, 2018

(30) Foreign Application Priority Data

Sep. 22, 2016 (CN) .......................... 2016 1 0843229

(51) Int. Cl.
G06K 9/34 (2006.01)
G06K 9/62 (2006.01)
G06T 7/00 (2017.01)
(52) U.S. Cl.
CPC ......... *G06K 9/6282* (2013.01); *G06K 9/6215* (2013.01); *G06T 7/0081* (2013.01); *G06T 2207/10028* (2013.01)
(58) Field of Classification Search
CPC ............... G06K 9/6282; G06K 9/6215; G06K 2207/10028
See application file for complete search history.

(56) References Cited

U.S. PATENT DOCUMENTS

| 8,680,994 | B2* | 3/2014 | Leppanen | G06K 9/00657 340/2.81 |
| 2014/0241617 | A1* | 8/2014 | Shotton | G06K 9/00671 382/159 |
| 2016/0239960 | A1* | 8/2016 | Byers | G06T 7/0012 |
| 2017/0184399 | A1* | 6/2017 | Thayer | G01C 13/008 |

OTHER PUBLICATIONS

Wenkai Li et al., "A New Method for Segmenting Individual Trees from the LiDAR Point Cloud," Photogrammetric Engineering & Remote Sensing 78:75-84, Jan. 2012 (10 pages).

* cited by examiner

*Primary Examiner* — Samir A Ahmed
(74) *Attorney, Agent, or Firm* — McCarter & English, LLP (57) ABSTRACT

Embodiments of the present disclosure disclose a single-tree segmentation method and apparatus. The method includes: acquiring point cloud data in a region to be segmented, classifying a highest point in the point cloud data into a target tree point cloud, setting an infinite point, and classifying the set point into a non-target tree point cloud; comparing similarity between a current point to be classified and a current target tree point cloud with similarity between the current point to be classified and a current non-target tree point cloud for each point to be classified in the point cloud data, and classifying the current point to be classified into corresponding point cloud according to a comparison result; and segmenting a final target tree point cloud into point cloud data corresponding to a target tree after all points to be classified are completely classified.

10 Claims, 8 Drawing Sheets

SINGLE TREE SEGMENTATION METHOD AND APPARATUS

CROSS-REFERENCES TO RELATED APPLICATIONS

This application claims priority to Chinese Patent Application No. 201610843229.0, filed on Sep. 22, 2016, which is incorporated herein by reference in its entirety.

TECHNICAL FIELD

Embodiments of the present disclosure relate to the field of forest resource analyzing technologies, and in particular to a single-tree segmentation method and apparatus.

BACKGROUND

Forest parameter includes forest stand scale parameter and single-tree scale parameter, emergence of remote sensing technologies brings technical innovation to extraction of forest parameters, and by combining aerial photographs with fieldwork investigation, manual labor and time can be greatly saved. Ordinary optical remote sensing is easily influenced by factors such as illumination, atmosphere, observation angles, and only two-dimensional information can be acquired, so that application range is limited. Light Detection and Ranging (LiDAR) is an emerging active three-dimensional remote sensing technology, which can simultaneously acquire horizontal distribution and vertical structure information of a forest canopy surface and further can acquire forest parameters of the forest stand scale and provide forest parameters of the single-tree scale based on high-density LiDAR point cloud data.

Single-tree segmentation needs to be performed firstly while forest parameters of the single-tree scale are acquired based on point cloud data. At present, a single-tree segmentation method in general use is a segmentation method based on raster images. However, precision of such a segmentation method depends on a resolution ratio of the raster images to a great extent, and precision of the point cloud data in an aspect of a vertical structure is lost in the process of transforming point cloud into raster, so that segmentation effect is not ideal.

SUMMARY

Embodiments of the present disclosure aim to provide a single-tree segmentation method and apparatus, so as to optimize the existing single-tree segmentation solution.

On one hand, embodiments of the present disclosure provide a single-tree segmentation method, including:

acquiring point cloud data in a region to be segmented;

classifying a highest point in the point cloud data into a target tree point cloud, setting an infinite point, and classifying the set point into a non-target tree point cloud;

comparing similarity between a current point to be classified and a current target tree point cloud with similarity between the current point to be classified and a current non-target tree point cloud for each point to be classified in the point cloud data, and classifying the current point to be classified into corresponding point cloud according to a comparison result;

segmenting a final target tree point cloud into point cloud data corresponding to a target tree after all points to be classified are completely classified.

On the other hand, embodiments of the present disclosure provide a single-tree segmentation apparatus, including:

a point cloud data acquisition module, configured to acquire point cloud data in a region to be segmented;

a first classifying module, configured to classify a highest point in the point cloud data into a target tree point cloud, set an infinite point, and classify the set point into a non-target tree point cloud;

a second classifying module, configured to compare similarity between a current point to be classified and a current target tree point cloud with similarity between the current point to be classified and a current non-target tree point cloud for each point to be classified in the point cloud data, and classify the current point to be classified into corresponding point cloud according to a comparison result;

a segmentation module, configured to segment a final target tree point cloud into point cloud data corresponding to a target tree after all points to be classified are completely classified.

According to a single-tree segmentation solution in embodiments of the present disclosure, single-tree segmentation is directly performed according to point cloud data after the point cloud data in a region to be segmented is acquired, a highest point in the point cloud data is classified into a target tree point cloud, an infinite point is set, and the set point is classify into a non-target tree point cloud, similarity between a current point to be classified and a current target tree point cloud is compared with similarity between the current point to be classified and a current non-target tree point cloud for each point to be classified in the point cloud data, and the current point to be classified is classified into corresponding point cloud according to a comparison result, and a final target tree point cloud is segmented into point cloud data corresponding to a target tree after all points to be classified are completely classified.

DETAILED DESCRIPTION

In order to conveniently understand the technical solution and corresponding beneficial effects of embodiments of the present disclosure, a common single-tree segmentation solution in the existing art is introduced.

Point cloud data are acquired based on a LiDAR technology, a point cloud is filtered, a digital elevation model (DEM) and a digital surface model (DSM) are respectively generated, and a canopy height model (CHM) is acquired by virtue of a difference between the DEM and the DSM. Then the CHM is segmented to achieve a single-tree identification aim. A point cloud segmentation representative algorithm based on CHM includes a local maximum focal filter method and a watershed segmentation algorithm. The algorithms are based on the CHM, precision of the algorithms greatly depends on precision of the CHM since errors are introduced in the CHM generating process due to factors such as point density and topographic relief, and precision of the point cloud data in the vertical structure aspect is lost in the process of transforming the point cloud into raster, and therefore, segmentation effect is not ideal.

The technical solution of the present disclosure is further described in details by combining the drawings by virtue of specific implementation manners. It should be understood that, the specific embodiments described here are only used for illustrating the present disclosure, not limiting the present disclosure. In addition, it should be noted that, in order to conveniently describe, only parts related to the present disclosure are illustrated in the drawings, but not total structures.

It should be mentioned that, some example embodiments are described to serve as processing or methods of flow diagram description before the example embodiments are discussed in details. Although multiple steps are described into sequential processing in the flow diagram, many steps there can be implemented concurrently, concomitantly or simultaneously. In addition, a sequence of the multiple steps can be rearranged. The processing can be ended when the operation is completed, however, the processing can include additional steps which are no included in the drawings. The processing can correspond to methods, functions, procedures, subroutines, subprograms and the like.

Embodiment I

Figure 1:
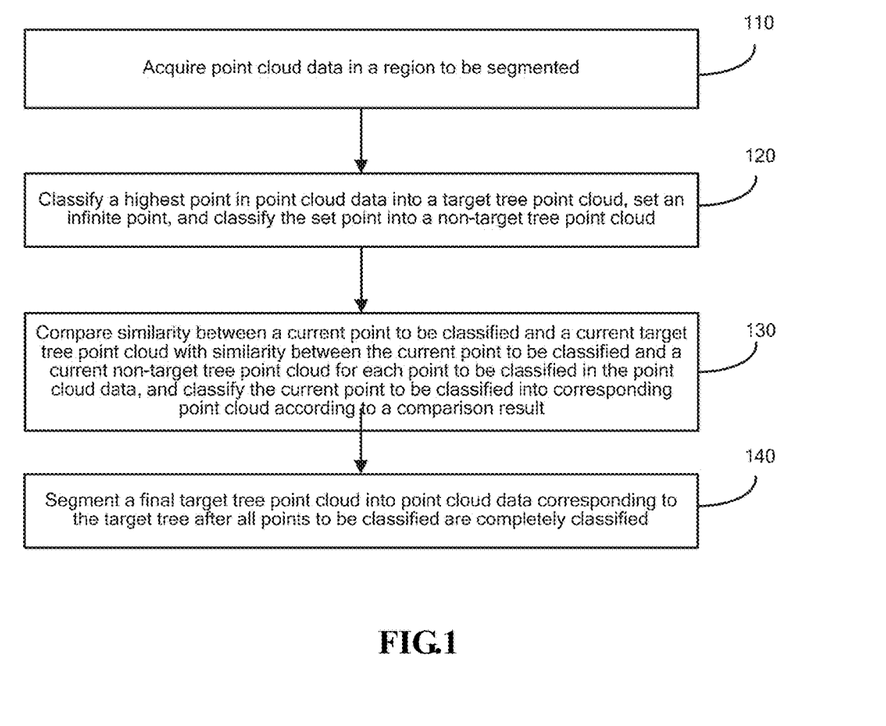
FIG. 1 is a flow diagram illustrating a single-tree segmentation method provided by embodiment I of the present disclosure.

FIG. 1 is a flow diagram illustrating a single-tree segmentation method provided by embodiment I of the present disclosure. The method can be executed by a single-tree segmentation apparatus, where the device can be implemented by software and/or hardware, and can generally be integrated into a terminal such as a computer. As shown in FIG. 1, the method includes the following.

In step 110, point cloud data in a region to be segmented are acquired.

Illustratively, the region to be segmented specifically can be a forest region to be segmented, which is a whole forest or one part of region of the whole forest. Area of the region to be segmented can be determined by configurations such as internal storage of a computer, an image processor and the like. The region to be segmented can be selected in a treeing manner so as to improve segmentation efficiency. For example, the region to be segmented can be selected in a manner of establishing an octree or a kd (k-dimensional) tree. In addition, varieties of trees in the forest are not specifically defined in embodiments of the present disclosure, and trees can be coniferous forest or broad-leaved forest and other forests.

The point cloud data in the region to be segmented specifically can be normalized point cloud data.

In step 120, a highest point in point cloud data is classified into a target tree point cloud, an infinite point is set, and the set point is classified into a non-target tree point cloud.

It should be understood that a height of a top of a tree is larger than that of other points of the tree, a global highest point can be searched in point cloud data to serve as a top of a target tree, and the highest point is classified into the target tree point cloud to become a first point in the target tree point cloud. The basic idea of the method in the present embodiment is that a certain horizontal distance always exists between tops of trees, all points belonging to a target tree can be found by virtue of region growing after a top of the target tree is found, that is, points of the target tree are distinguished from points of other trees, so as to achieve an aim of segmenting a single target tree.

In the present embodiment, other trees except the target tree are called non-target trees, and a point cloud corresponding to the non-target trees is a non-target tree point cloud. An infinite point can be set and the set point is classified into the non-target tree point cloud when a first point in the non-target tree point cloud is determined.

In step 130, similarity between a current point to be classified and a current target tree point cloud is compared with similarity between the current point to be classified and a current non-target tree point cloud for each point to be classified in the point cloud data, and the current point to be classified is classified into corresponding point cloud according to a comparison result.

Illustratively, the point to be classified can specifically refer to all points except the target tree point cloud in step 120, that is, all points except the top of the target tree can serve as points to be classified.

All points to be classified are classified one by one in the present embodiment, no classifying sequence is specifically defined in the present embodiment, and points can be randomly selected and further can be classified according to a height sequence of points to be classified. When points to be classified are classified, and similarity between the current point to be classified and the current target tree point cloud is compared with similarity between the current point to be classified and the current non-target tree point cloud, and the current point to be classified is classified into a point cloud relatively close to the current point to be classified.

If similarity between the current point to be classified and the current target tree point cloud is higher than that of the current point to be classified and the current non-target tree point cloud, the current point to be classified may be classified into the current non-target tree point cloud when the current point to be classified is out of a preset region, where the preset region is a circular region which takes a highest point as a center and takes a preset length as a radius. It should be understood that, points out of the circular region which takes a top of the target tree as a center and takes a certain length as a radius can be generally considered as points of other trees except the target tree after the top of the target tree is found, where the certain length is the preset length. A specific value of the preset length is not specifically defined in the present embodiment and can be set according to varieties of trees in the region to be segmented, tree spacing information for field trip and other data. For example, for general coniferous forest, the preset length can be set as 2 m.

In step 140, a final target tree point cloud is segmented into point cloud data corresponding to the target tree after all points to be classified are completely classified.

Illustratively, all points to be classified are classified into two types after all points to be classified are completely classified, namely points of target trees and points of non-target trees. Points of target trees are classified into the target tree point cloud, and the final target tree point cloud is segmented into point cloud data corresponding to the target tree, so that single-tree segmentation of the target tree is realized.

Figure 2:
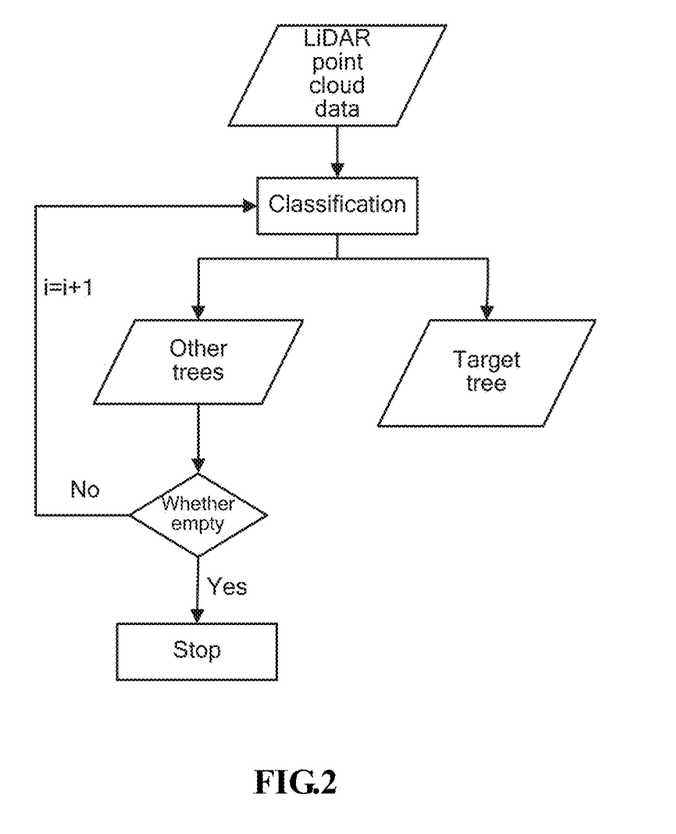
FIG. 2 is a diagram illustrating a single-tree segmentation process provided by embodiment I of the present disclosure.

It should be understood that, after a target tree is segmented, point cloud data of the target tree can be removed from a region to be segmented so as to form a new region to be segmented; and then, a next target tree is segmented from the new region to be segmented. By parity of reasoning, only one tree is segmented in each cycle, and all trees are successively segmented from a point cloud of an initial region to be classified by virtue of multiple iterations. FIG. 2 is a diagram illustrating a single-tree segmentation process provided by embodiment I of the present disclosure. As shown in FIG. 2, after LiDAR point cloud data are acquired, the point cloud data are classified into target trees and other trees (namely non-target trees), then whether points corresponding to other trees have been completely classified is judged, if not, cycling for i=i+1 times and returning to continuously classify, if yes, stopping segmentation.

According to a single-tree segmentation method in embodiment I of the present disclosure, after point cloud data in a region to be segmented are acquired, single-tree segmentation is directly performed according to the point cloud data. The highest point in the point cloud data is classified into a target tree point cloud, an infinite point is set and is classified into non-target tree point cloud, similarity between each point to be classified and the current target tree point cloud is compared with similarity between each point to be classified and the current non-target tree point cloud, and all points to be classified are successively classified into corresponding point cloud according to a comparison result, and the final target tree point cloud is segmented into point cloud data corresponding to a target tree. With the adoption of the above technical solution, single-tree segmentation is directly performed according to point cloud data, precision lost in a process of transforming point cloud into raster and other models is reduced, segmentation effect is effectively improved, algorithm complexity is relatively low, time efficiency is high, limitations of topography and region are avoided, single-tree segmentation can be performed in a wide range, and segmentation effect is obvious.

Embodiment II

Figure 3:
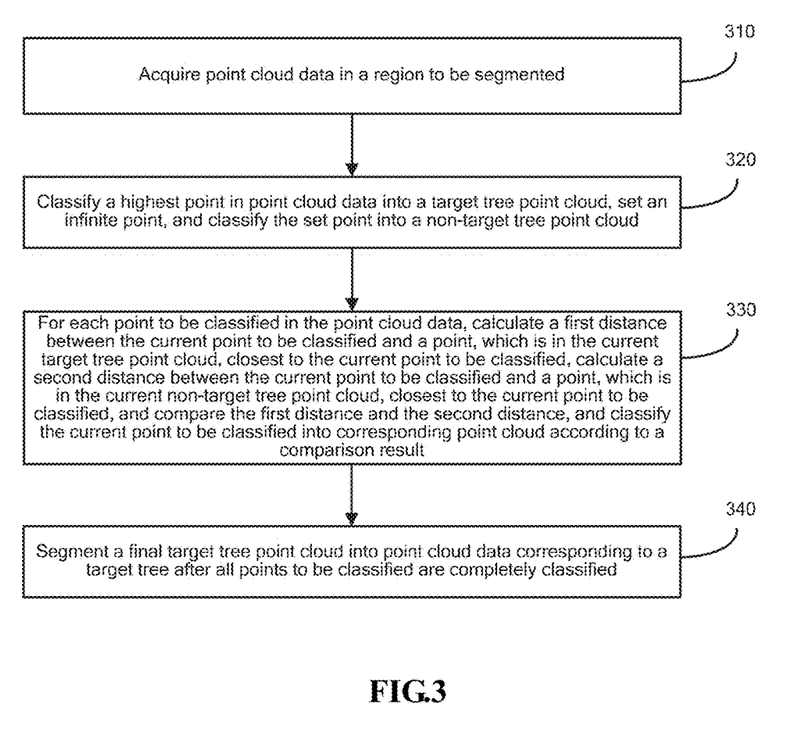
FIG. 3 is a flow diagram illustrating a single-tree segmentation method provided by embodiment II of the present disclosure.

FIG. 3 is a flow diagram illustrating a single-tree segmentation method provided by embodiment II of the present disclosure. The present embodiment is optimized based on the above embodiment. In the present embodiment, the "similarity between the current point to be classified and a current target tree point cloud is compared with similarity between the current point to be classified and the current non-target tree point cloud, and the current point to be classified is classified into corresponding point cloud according to a comparison result" is optimized into that: a first distance between the current point to be classified and a point, which is in the current target tree point cloud, closest to the current point to be classified is calculated; a second distance between the current point to be classified and a point, which is in the current non-target tree point cloud, closest to the current point to be classified is calculated; and the first distance and the second distance are compared, and the current point to be classified is classified into corresponding point cloud according to a comparison result.

Correspondingly, the method in the present embodiment includes following steps.

In step 310, point cloud data in a region to be segmented are acquired;

In step 320, a highest point in point cloud data is classified into a target tree point cloud, an infinite point is set, and the set point is classified into a non-target tree point cloud.

In step 330, for each point to be classified in the point cloud data, a first distance between the current point to be classified and a point, which is in the current target tree point cloud, closest to the current point to be classified is calculated, a second distance between the current point to be classified and a point, which is in the current non-target tree point cloud, closest to the current point to be classified is calculated, and the first distance and the second distance are compared, and the current point to be classified is classified into corresponding point cloud according to a comparison result.

Classifying the current point to be classified into corresponding point cloud according to the comparison result can specifically include: the current point to be classified is classified into the current target tree point cloud when the first distance is smaller than the second distance and the first distance is smaller than a preset distance value; the current point to be classified is classified into the current non-target tree point cloud when the first distance is greater than or equal to the second distance or the first distance is greater than or equal to a preset distance value.

Illustratively, it shows that the current point to be classified is close to the target tree point cloud when the first distance is smaller than the second distance, and in order to avoid the condition that a point to be classified, which is close to the target tree point cloud but does not belong to the target tree point cloud, is wrongly classified into the target tree point cloud, a decision condition can be added, that is, the first distance is small than the preset distance value, a specific value of the preset distance value is not defined in the present embodiment, can be set according to varieties of trees in the region to be segmented, tree spacing information for field trip and other data, and can be as same as or different from the above value of the preset length. For example, for general coniferous forest, the preset distance value can be set as 2 m or 1.9 m.

Figure 4A:
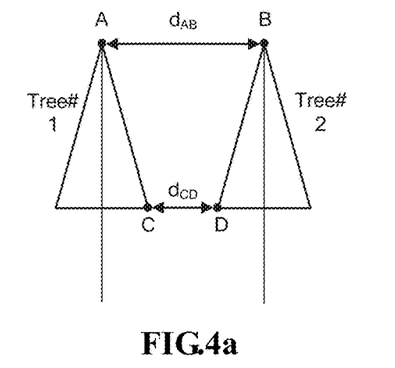
FIG. 4a is a schematic diagram illustrating a tree distance provided by embodiment III of the present disclosure.
Figure 4B:
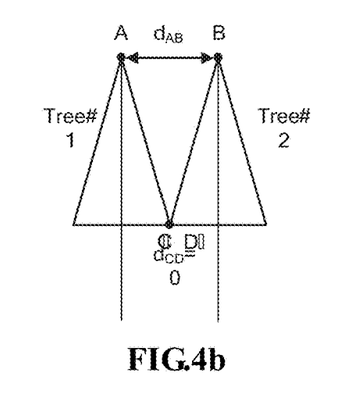
FIG. 4b is a schematic diagram illustrating another tree distance provided by embodiment III of the present disclosure.

Points to be classified may be classified according to a height sequence of points to be classified. FIG. 4a is a schematic diagram illustrating a tree distance provided by embodiment III of the present disclosure, and FIG. 4b is a schematic diagram illustrating another tree distance provided by embodiment III of the present disclosure. As shown in FIG. 4a and FIG. 4b, assuming that a tree #1 is a target tree, A is a top of the tree #1; and assuming that a tree #2 is a non-target tree and B is a top of the tree #2. It can be seen that a certain horizontal distance always exists between the two trees, and a distance between tops of the trees is greater than that between the bottoms. Although trees shield with one another in dense forest, while a certain distance still exists between tops of trees. Therefore, points to be classified are sequentially classified from tops of trees according to a height sequence of points to be classified based on a top-down thought, and single-tree segmentation efficiency and accuracy can be further improved.

Figure 5:
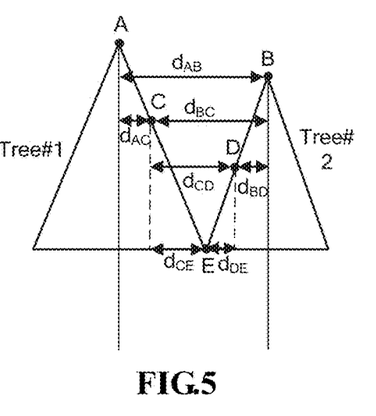
FIG. 5 is a diagram illustrating a classifying principle of points to be classified provided by embodiment III of the present disclosure.

FIG. 5 is a diagram illustrating a classifying principle of points to be classified provided by embodiment III of the present disclosure, as shown in FIG. 5, assuming that a tree #1 is a target tree, A is a top of the tree #1 (can be regarded as a seed point) and is also a first point in the target tree point cloud; and assuming that a tree #2 is a non-target tree and B is a first point in the non-target tree point cloud, and a distance $d_{AB}$ between A and B is assumed to be 2.5 m (greater than the preset length of 2 m). For a point C to be classified, a point closest to the current target tree point cloud is A, and the first distance is $d_{AC}$; and, a point closest to the current non-target tree point cloud is B, and the second distance is $d_{BC}$, and the point C is classified into the target tree point cloud since $d_{AC}$ is smaller than $d_{BC}$ and is smaller than the preset distance value of 2 m. For a point D to be classified, a point closest to the current target tree point cloud is C, and the first distance is $d_{CD}$; and, a point closest to the current non-target tree point cloud is B, and the second distance is $d_{BD}$, and the point D is classified into the non-target tree point cloud since $d_{CD}$ is greater than $d_{BD}$. For a point E to be classified, a point closest to the current target tree point cloud is C, and the first distance is $d_{CE}$; and, a point closest to the current non-target tree point cloud is D, and the second distance is $d_{DE}$, and the point E is classified into the non-target tree point cloud since $d_{CE}$ is greater than $d_{DE}$. Points to be classified are classified successively according to a height sequence of points to be classified according to the above principles, points belonging to the target tree can be rapidly and accurately found, so as to realize segmentation of the target tree.

In step 340, a final target tree point cloud is segmented into point cloud data corresponding to a target tree after all points to be classified are completely classified.

The classifying process of points to be classified is refined in embodiment II of the present disclosure on the basis of the above embodiment, and time efficiency and accuracy of the single-tree segmentation method are further improved.

Embodiment III

Figure 6:
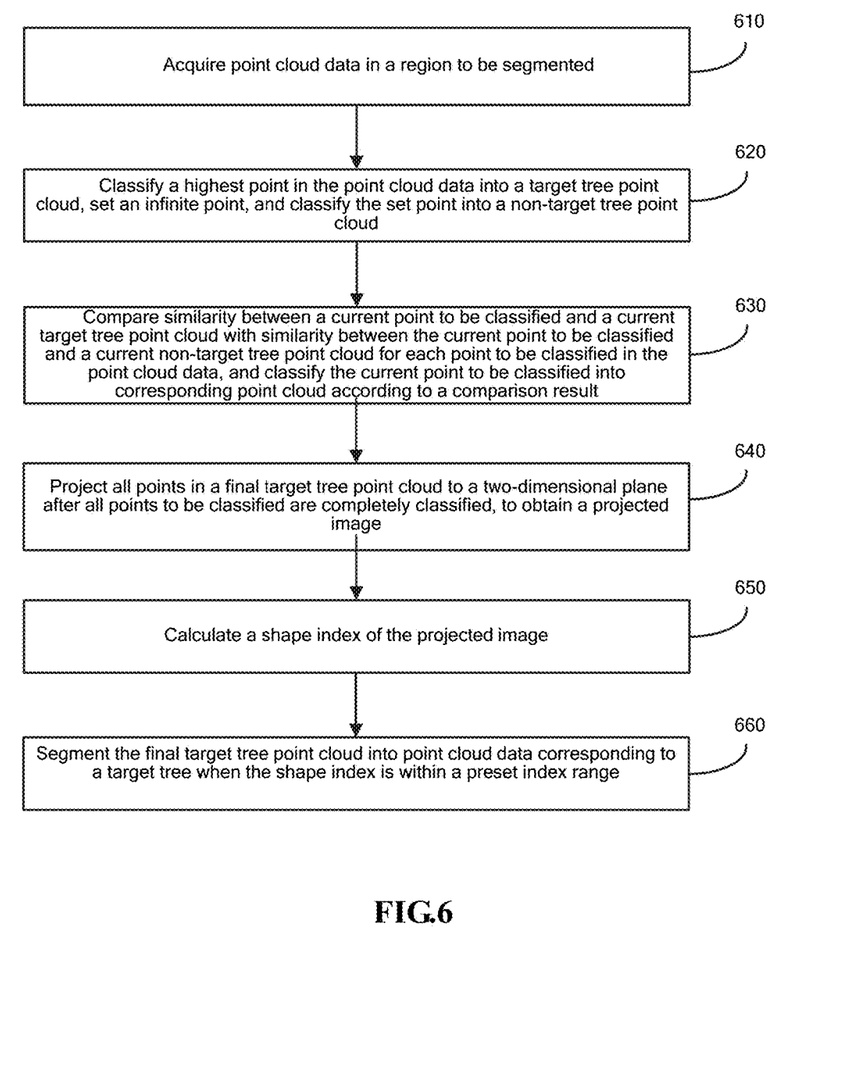
FIG. 6 is a flow diagram illustrating a single-tree segmentation method provided by embodiment III of the present disclosure.

FIG. 6 is a flow diagram illustrating a single-tree segmentation method provided by embodiment III of the present disclosure. The present embodiment is optimized based on the above embodiment. In the present embodiment, a step of "the final target tree point cloud is segmented into point cloud data corresponding to a target tree after all points to be classified are completely classified" is optimized into that: all points in the final target tree point cloud are projected to a two-dimensional plane after all points to be classified are completely classified, so as to obtain a projected image, a shape index of the projected image is calculated, and the final target tree point cloud is segmented into point cloud data corresponding to a target tree when the shape index is within a preset index range.

Correspondingly, the method in the present embodiment includes following steps.

In step 610, point cloud data in a region to be segmented is acquired.

In step 620, a highest point in the point cloud data is classified into a target tree point cloud, an infinite point is set, and the set point is classified into a non-target tree point cloud.

In step 630, similarity between a current point to be classified and a current target tree point cloud is compared with similarity between the current point to be classified and a current non-target tree point cloud for each point to be classified in the point cloud data, and the current point to be classified is classified into corresponding point cloud according to a comparison result.

Concrete details of the present step can refer to related descriptions in above embodiments, and unnecessary details are avoided here.

In step 640, after all points to be classified are completely classified, all points in a final target tree point cloud are projected to a two-dimensional plane, to obtain a projected image.

In step 650, a shape index of the projected image is calculated.

Illustratively, the shape index of the projected image can be calculated according to the following formula:

$$SI = \frac{P}{4 \times \sqrt{A}}$$

where, the SI (Shape Index) refers to the shape index of the projected image, the P refers to perimeter of the projected image, and the A refers to area of the projected image.

It should be understood that, methods for calculating the shape index of the projected image are not limited to the above formula, and those skilled in the art can design according to actual requirements.

In step 660, the final target tree point cloud is segmented into point cloud data corresponding to a target tree when the shape index is within a preset index range.

Illustratively, for the formula, the greater the SI, the longer and thinner a shape of the projected image (two-dimensional convex hull). Therefore, the preset index range (smaller than a for example) can be set. When the shape index is within the preset index range, it is indicated that data corresponding to the final target tree point cloud can be data of the target tree, but not data of branches of other trees, and therefore, the final target tree point cloud can be segmented into point cloud data corresponding to the target tree.

Figure 7A:
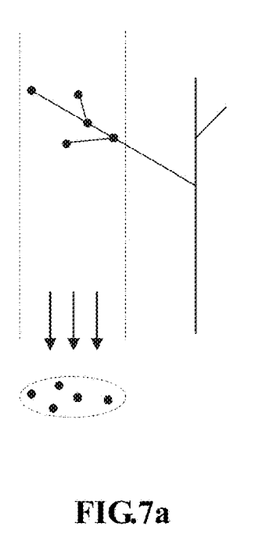
FIG. 7a is a diagram illustrating a projected image provided by embodiment III of the present disclosure.
Figure 7B:
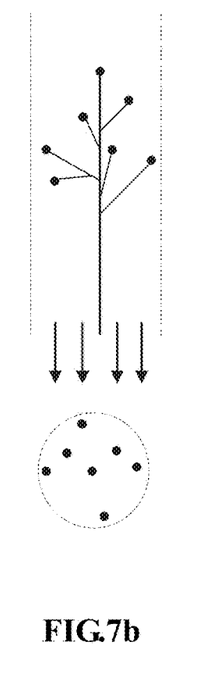
FIG. 7b is a diagram illustrating another projected image provided by embodiment III of the present disclosure.

FIG. 7a is a diagram illustrating a projected image provided by embodiment III of the present disclosure, and FIG. 7b is a diagram illustrating another projected image provided by embodiment III of the present disclosure. As shown in FIG. 7a, the projected image (two-dimensional convex hull) acquired after projecting to the two-dimensional plane is close to ellipse (the SI value is relatively great) if all points in the final target tree point cloud correspond to long and protruding branches of other trees. As shown in FIG. 7b, the projected image acquired after projecting to the two-dimensional plane is close to circle (the SI value is relatively small) if all points in the final target tree point cloud correspond to one tree. Therefore, whether the classified target tree point cloud is accurate can be distinguished by measuring the shape index of the projected image, and accuracy of the single-tree segmentation method is further improved.

Figure 8:
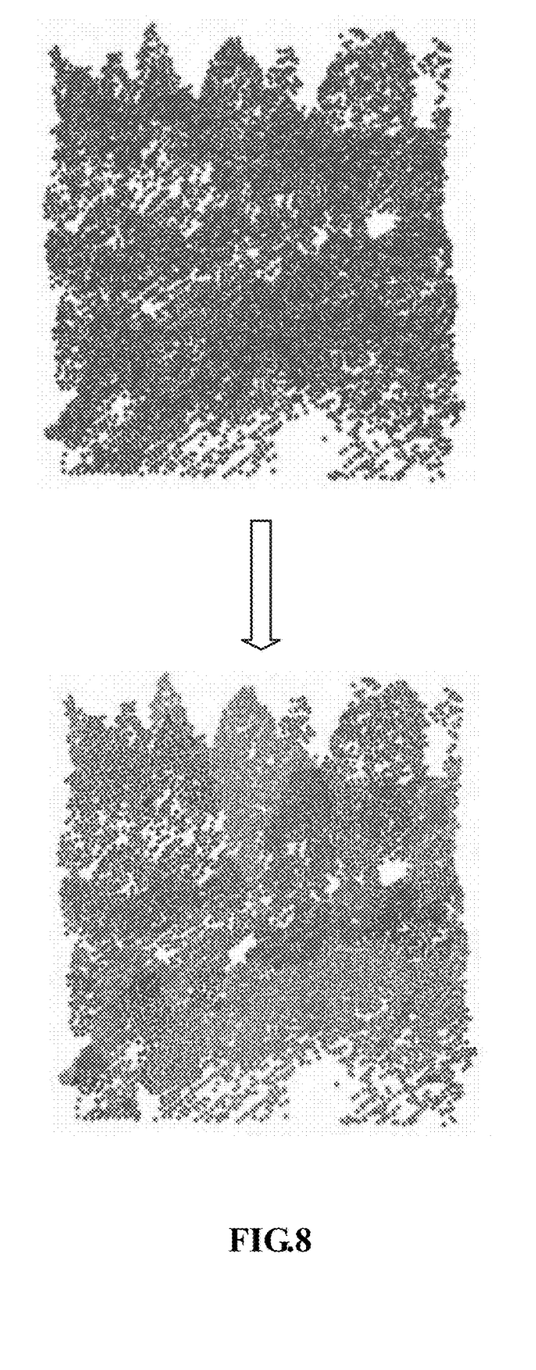
FIG. 8 is a schematic diagram illustrating contrast of single-tree segmentation effects provided by embodiment III of the present disclosure.

The final target tree point cloud is further verified in embodiment III of the present disclosure on the basis of above embodiments, and accuracy of the single-tree segmentation method can be further improved. Experiments prove that 86% of trees can be detected when the method in the present embodiment is applied to coniferous forest workspace, 94% of segmented trees are accurate, and an overall accuracy rate F-score is 90%. FIG. 8 is a schematic diagram illustrating contrast of single-tree segmentation effects provided by embodiment III of the present disclosure, as shown in FIG. 8, the above point cloud data image can be successfully segmented into an image below by virtue of the method in embodiments of the present disclosure, and each region of different gray level in the image below represents a segmented tree.

Embodiment IV

Figure 9:
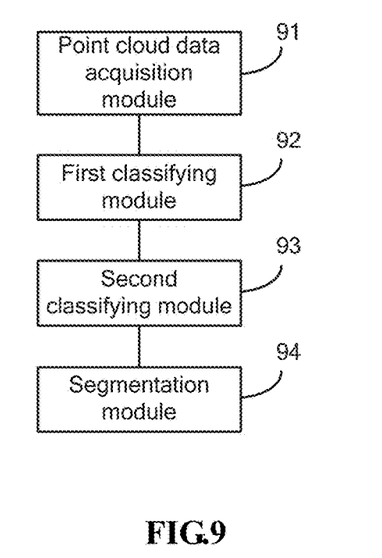
FIG. 9 is a structural block diagram illustrating a single-tree segmentation apparatus provided by embodiment IV of the present disclosure.

FIG. 9 is a structural block diagram illustrating a single-tree segmentation apparatus provided by embodiment IV of the present disclosure. The apparatus can be implemented by software and/or hardware and is generally integrated into a computer or other terminals, and single-tree segmentation can be performed by executing a single-tree segmentation method. As shown in FIG. 9, the apparatus includes a point cloud data acquisition module 91, a first classifying module 92, a second classifying module 93 and a segmentation module 94, where, the point cloud data acquisition module 91 is configured to acquire point cloud data in a region to be segmented; the first classifying module 92 is configured to classify a highest point in the point cloud data into a target tree point cloud, set an infinite point, and classify the set point into a non-target tree point cloud; the second classifying module 93 is configured to compare similarity between a current point to be classified and a current target tree point cloud with similarity between the current point to be classified and a current non-target tree point cloud for each point to be classified in the point cloud data, and classify the current point to be classified into corresponding point cloud according to a comparison result; and the segmentation module 94 is configured to segment a final target tree point cloud into point cloud data corresponding to a target tree after all points to be classified are completely classified.

According to the single-tree segmentation apparatus provided by embodiments of the present disclosure, single-tree segmentation is directly performed according to the point cloud data, precision lost in a process of transforming point cloud into raster and other models is reduced, segmentation effect is effectively improved, algorithm complexity is relatively low, time efficiency is high, limitations of topography and region are avoided, single-tree segmentation can be performed in a wide range, and segmentation effect is obvious.

On the basis of above embodiments, comparing similarity between the current point to be classified and the current target tree point cloud with similarity between the current point to be classified and the current non-target tree point cloud for each point to be classified in the point cloud data, and classifying the current point to be classified into corresponding point cloud according to a comparison result, includes: calculating a first distance between the current point to be classified and a point, which is in the current target tree point cloud, closest to the current point to be classified; calculating a second distance between the current point to be classified and a point, which is in the current non-target tree point cloud, closest to the current point to be classified; comparing the first distance and the second distance, and classifying the current point to be classified into corresponding point cloud according to the comparison result.

On the basis of above embodiments, classifying the current point to be classified into corresponding point cloud according to the comparison result, includes: classifying the current point to be classified into the current target tree point cloud when the first distance is smaller than the second distance and the first distance is smaller than a preset distance value; classifying the current point to be classified into the current non-target tree point cloud when the first distance is greater than or equal to the second distance or the first distance is greater than or equal to a preset distance value.

On the basis of above embodiments, the segmentation module includes a projection unit, a shape index calculation unit and a segmentation unit, where the projection unit is configured to project all points in the final target tree point cloud to a two-dimensional plane after all points to be classified are completely classified, to obtain a projected image; the shape index calculation unit is configured to calculate a shape index of the projected image; and the segmentation unit is configured to segment the final target tree point cloud into point cloud data corresponding to a target tree when the shape index is within a preset index range.

On the basis of above embodiments, the shape index calculation unit is specifically configured to:

calculate the shape index of the projected image according to the following formula:

$$SI = \frac{P}{4 \times \sqrt{A}}$$

where, the SI refers to the shape index of the projected image, the P refers to perimeter of the projected image, and the A refers to area of the projected image.

Embodiment V

Embodiments of the present disclosure further provide a storage medium including a computer executable instruction. The computer executable instruction is configured to execute a single-tree segmentation method when executed by a computer processor. The method includes:

acquiring point cloud data in a region to be segmented, classifying a highest point in the point cloud data into a target tree point cloud, and setting an infinite point and classifying the set point into a non-target tree point cloud; comparing similarity between a current point to be classified and the current target tree point cloud with similarity between the current point to be classified and the current non-target tree point cloud for each point to be classified in the point cloud data, and classifying the current point to be classified into corresponding point cloud according to a comparison result; and segmenting a final target tree point cloud into point cloud data corresponding to a target tree after all points to be classified are completely classified.

Optionally, the computer executable instruction further can be configured to execute a technical solution of the single-tree segmentation method provided by any embodiment of the present disclosure when executed by the computer processor.

Through the above description of the implementation manners, those skilled in the art can understand clearly that the disclosure can be realized by the aid of software and necessary universal hardware, or through hardware certainly, however, the former is a better implementation manner in many cases. On the basis of such understanding, essence or a part contributing the existing art of the technical solution of the present disclosure can be embodied in the form of a software product, and the computer software product can be stored in a computer-readable storage medium, such as a floppy disk of the computer, a Read-Only Memory (ROM), a Random Access Memory (RAM), a flash (FLASH), a hard disk or an optical disk and the like, including several instructions for enabling a computer device (can be a personal computer, a server, or a network device and the like) to execute the method of embodiments of the prevent disclosure.

Embodiment VI

Figure 10:
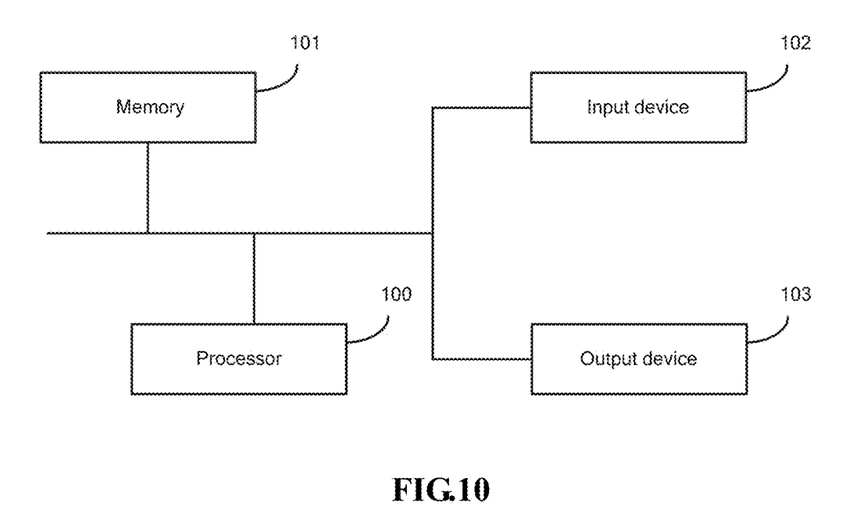
FIG. 10 is a structural block diagram illustrating a terminal provided by embodiment VI of the present disclosure.

Embodiment VI of the present disclosure provides a terminal, including a single-tree segmentation apparatus provided by any embodiment of the present disclosure, Specifically, FIG. 10 is a block diagram illustrating a terminal provided by embodiment VI of the present disclosure. As shown in FIG. 10, embodiments of the present disclosure provide a terminal, including processors 100, a memory 101, an input device 102 and an output device 103; one or more processors 10 can be arranged in the terminal, and one processor 100 is taken as an example in FIG. 10. The processors 100, the memory 101, the input device 102 and the output device 103 in the terminal can be connected by a bus or in other manners, and connection by virtue of a bus is taken as an example in FIG. 10.

The memory 101 serves as a computer-readable storage medium which can be configured to store software programs, computer executable programs and modules, such as program instructions/modules corresponding to a single-tree segmentation method in embodiments of the present disclosure (i.e. a point cloud data acquisition module 91, a first classifying module 92, a second classifying module 93 and a segmentation module 94 in the single-tree segmentation apparatus). The processor 100 is enabled to execute various function applications and data processing of the terminal by operating the software programs, instructions and modules stored in the memory 101, that is, the above single-tree segmentation method is implemented.

The memory 101 can mainly include a program storage region and a data storage region, where the program storage region can be configured to store application programs needed by an operating system and at least one function; and the data storage region can be configured to store data established according to use of a terminal and the like. In addition, the memory 101 can include a high-speed random access memory and nonvolatile memories, such as at least one disk storage device, a flash memory device or other nonvolatile solid state storage devices. In some embodiments, the memory 101 can further include memories which are remotely set relative to the processor 100. The remote memories can be connected to the terminal by virtue of a network. Examples of the above network can include but not limited to internet, intranet, local region network, mobile communication network and combinations.

The input device 102 can be configured to receive the input digit or character information and generate key signal input related to user setting and function control of a terminal. The output device 103 can include a display screen and other display devices.

The single-tree segmentation apparatus, storage medium and terminal provided in above embodiments can execute the single-tree segmentation method provided by any embodiment of the present disclosure, and have corresponding functional modules for executing the method as well as beneficial effects. Technical details which are not described in the present embodiment can refer to the single-tree segmentation method provided by any embodiment of the present disclosure.

It should be noted that, the above descriptions are only better embodiments and used technical principles of the present disclosure. Those ordinary skilled in the art should understand that the present disclosure is not only limited to the specific embodiments here, and they can perform various obvious modifications, readjustments and replacements without departing from the protection scope of the present disclosure. Therefore, although the present disclosure is illustrated in detail with reference to above embodiments, the present disclosure is not only limited to above embodiments, and further can include more other equivalent embodiments under the condition of not departing from the concept of the present disclosure, while the scope of the present disclosure is determined by the scope of the attached claims.

What is claimed is:

1. A single-tree segmentation method, comprising:
acquiring, by a processor, point cloud data in a region to be segmented;
classifying, by the processor, a highest point in the point cloud data into a target tree point cloud, setting, by the processor, an infinite point, and classifying, by the processor, the set point into a non-target tree point cloud;
comparing, by the processor, similarity between a current point to be classified and a current target tree point cloud with similarity between the current point to be classified and a current non-target tree point cloud for each point to be classified in the point cloud data, and classifying by the processor, the current point to be classified into corresponding point cloud according to a comparison result; and
segmenting, by the processor, a final target tree point cloud into point cloud data corresponding to a target tree after all points to be classified are completely classified.

2. The method according to claim 1, wherein comparing, by the processor, similarity between the current point to be classified and the current target tree point cloud with similarity between the current point to be classified and the current non-target tree point cloud for each point to be classified in the point cloud data, and classifying, by the processor, the current point to be classified into corresponding point cloud according to the comparison result, comprises:
calculating, by the processor, a first distance between the current point to be classified and a point, which is in the current target tree point cloud, closest to the current point to be classified;
calculating, by the processor, a second distance between the current point to be classified and a point, which is in the current non-target tree point cloud, closest to the current point to be classified; and
comparing, by the processor, the first distance and the second distance, and classifying, by the processor, the current point to be classified into corresponding point cloud according to the comparison result.

3. The method according to claim 2, wherein classifying, by the processor, the current point to be classified into corresponding point cloud according to the comparison result, comprises:
classifying, by the processor, the current point to be classified into the current target tree point cloud when the first distance is smaller than the second distance and the first distance is smaller than a preset distance value; and classifying, by the processor, the current point to be classified into the current non-target tree point cloud when the first distance is greater than or equal to the second distance or the first distance is greater than or equal to a preset distance value.

4. The method according to claim 1, wherein segmenting, by the processor, the final target tree point cloud into point cloud data corresponding to a target tree after all points to be classified are completely classified, comprises:
projecting, by the processor, all points in the final target tree point cloud to a two-dimensional plane after all points to be classified are completely classified, to obtain a projected image;
calculating, by the processor, a shape index of the projected image; and
segmenting, by the processor, the final target tree point cloud into point cloud data corresponding to a target tree when the shape index is within a preset index range.

5. The method according to claim 4, wherein calculating, by the processor, the shape index of the projected image, comprises:
calculating, by the processor, the shape index of the projected image according to the following formula:

$$SI = \frac{P}{4 \times \sqrt{A}}$$

wherein, the SI refers to the shape index of the projected image, the P refers to perimeter of the projected image, and the A refers to area of the projected image.

6. A single-tree segmentation apparatus, comprising a processor and a storage device, wherein the storage device stores processor-executable programs, and the programs comprise:
a point cloud data acquisition module, configured to acquire point cloud data in a region to be segmented;
a first classifying module, configured to classify a highest point in the point cloud data into a target tree point cloud, set an infinite point, and classify the set point into a non-target tree point cloud;
a second classifying module, configured to compare similarity between a current point to be classified and a current target tree point cloud with similarity between the current point to be classified and a current non-target tree point cloud for each point to be classified in the point cloud data, and classify the current point to be classified into corresponding point cloud according to a comparison result; and
a segmentation module, configured to segment a final target tree point cloud into point cloud data corresponding to a target tree after all points to be classified are completely classified.

7. The apparatus according to claim 6, wherein comparing similarity between the current point to be classified and the current target tree point cloud with similarity between the current point to be classified and the current non-target tree point cloud for each point to be classified in the point cloud data, and classifying the current point to be classified into corresponding point cloud according to the comparison result, comprises:
calculating a first distance between the current point to be classified and a point, which is in the current target tree point cloud, closest to the current point to be classified;
calculating a second distance between the current point to be classified and a point, which is in the current non-target tree point cloud, closest to the current point to be classified; and
comparing the first distance and the second distance, and classifying the current point to be classified into corresponding point cloud according to the comparison result.

8. The apparatus according to claim 7, wherein classifying the current point to be classified into corresponding point cloud according to the comparison result, comprises:
classifying the current point to be classified into the current target tree point cloud when the first distance is smaller than the second distance and the first distance is smaller than a preset distance value; and
classifying the current point to be classified into the current non-target tree point cloud when the first distance is greater than or equal to the second distance or the first distance is greater than or equal to a preset distance value.

9. The apparatus according to claim 6, wherein the segmentation module comprises:
a projection unit, configured to project all points in the final target tree point cloud to a two-dimensional plane after all points to be classified are completely classified, to obtain a projected image;
a shape index calculation unit, configured to calculate a shape index of the projected image; and
a segmentation unit, configured to segment the final target tree point cloud into point cloud data corresponding to a target tree when the shape index is within a preset index range.

10. The apparatus according to claim 6, wherein the shape index calculation unit is specifically configured to:
calculate the shape index of the projected image according to the following formula:

$$SI = \frac{P}{4 \times \sqrt{A}}$$

wherein, the SI refers to the shape index of the projected image, the P refers to perimeter of the projected image, and the A refers to region of the projected image.

* * * * *